(12) United States Patent
Sharma et al.

(10) Patent No.: US 10,331,562 B2
(45) Date of Patent: *Jun. 25, 2019

(54) REAL-TIME CACHE REPAIR TOOL

(71) Applicant: Bank of America Corporation, Charlotte, NC (US)

(72) Inventors: Anuj Sharma, Jaipur (IN); Vishal Kelkar, Maharashtra (IN); Gaurav Srivastava, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,495

(22) Filed: Mar. 28, 2017

(65) Prior Publication Data

US 2018/0285270 A1    Oct. 4, 2018

(51) Int. Cl.
  *G06F 12/00* (2006.01)
  *G06F 12/0831* (2016.01)
(52) U.S. Cl.
  CPC .... *G06F 12/0831* (2013.01); *G06F 2212/621* (2013.01)
(58) Field of Classification Search
  None
  See application file for complete search history.

(56) References Cited

U.S. PATENT DOCUMENTS

| | | | |
|---|---|---|---|
| 5,636,355 A * | 6/1997 | Ramakrishnan | G06F 12/0804 711/113 |
| 7,107,400 B2 | 9/2006 | Benhase et al. | |
| 7,409,600 B2 | 8/2008 | Azevedo et al. | |
| 7,480,767 B2 | 1/2009 | Moser | |
| 7,840,848 B2 | 11/2010 | Azevedo et al. | |
| 9,569,367 B1 * | 2/2017 | Wigmore | G06F 12/0891 |
| 2012/0226871 A1 * | 9/2012 | Cantin | G06F 12/123 711/135 |
| 2016/0034394 A1 * | 2/2016 | McKean | G06F 12/0806 709/217 |
| 2017/0255556 A1 * | 9/2017 | Peng | G06F 12/0815 |

* cited by examiner

*Primary Examiner* — Prasith Thammavong
*Assistant Examiner* — Jason W Blust
(74) *Attorney, Agent, or Firm* — Michael A. Springs

(57) ABSTRACT

A cache repair tool includes an interface, a monitoring engine, and a purging engine. The interface receives a request to repair a cache. The request includes a maximum size threshold less than a total storage capacity of the cache. The request includes an identification of a data type. The monitoring engine determines an available capacity of the cache. The monitoring engine determines that the available capacity is less than or equal to the maximum size threshold. The purging engine purges data of the identified data type from the cache in response to the determination that the determined size exceeds the maximum size threshold.

15 Claims, 3 Drawing Sheets

REAL-TIME CACHE REPAIR TOOL

TECHNICAL FIELD

This disclosure relates generally to computer networking and more particularly to a real-time cache repair tool and a self-learning cache repair tool.

BACKGROUND

Applications utilize caches to operate. For example, a computing device executing an application may store information in a cache. Generally, a cache is an area of memory used by a central processing unit. A cache may have limited capacity. Over time, a cache may store an increasing amount of information. As an increased amount of information causes a cache to reach a high utilization, the cache may perform inefficiently, thus causing the application and the computing device to operate in an unintended manner.

SUMMARY OF THE DISCLOSURE

According to an embodiment, a cache repair tool includes an interface, a monitoring engine, and a purging engine. The interface receives a request to repair a cache. The request includes a maximum size threshold less than a total storage capacity of the cache. The request includes an identification of a data type. The monitoring engine determines an available capacity of the cache. The monitoring engine determines that the available capacity is less than or equal to the maximum size threshold. The purging engine purges data of the identified data type from the cache in response to the determination that the determined size exceeds the maximum size threshold.

According to another embodiment, an apparatus includes an interface, a capacity engine, a monitoring engine, and a purging engine. The interface receives a request to repair a cache. The capacity engine monitors a cache to determine a first amount of data the cache receives in a first predetermined amount of time. The capacity engine determines a second amount of data indicating an estimated amount of data the cache will receive in a second predetermined amount of time. The capacity engine determines a size of the cache and a maximum size threshold using the second amount of data. The monitoring engine determines an available capacity of the cache and that the available capacity is less than or equal to the maximum size threshold. The purging engine purges data from the cache.

Certain embodiments provide one or more technical advantages. For example, an embodiment facilitates maintaining caches. Some embodiments ensure caches utilized by an application operate efficiently. For example, certain embodiments clear items from a cache in an intelligent way. In this example, a cache may maintain an amount of data that does not overburden the cache while maintaining relevant data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
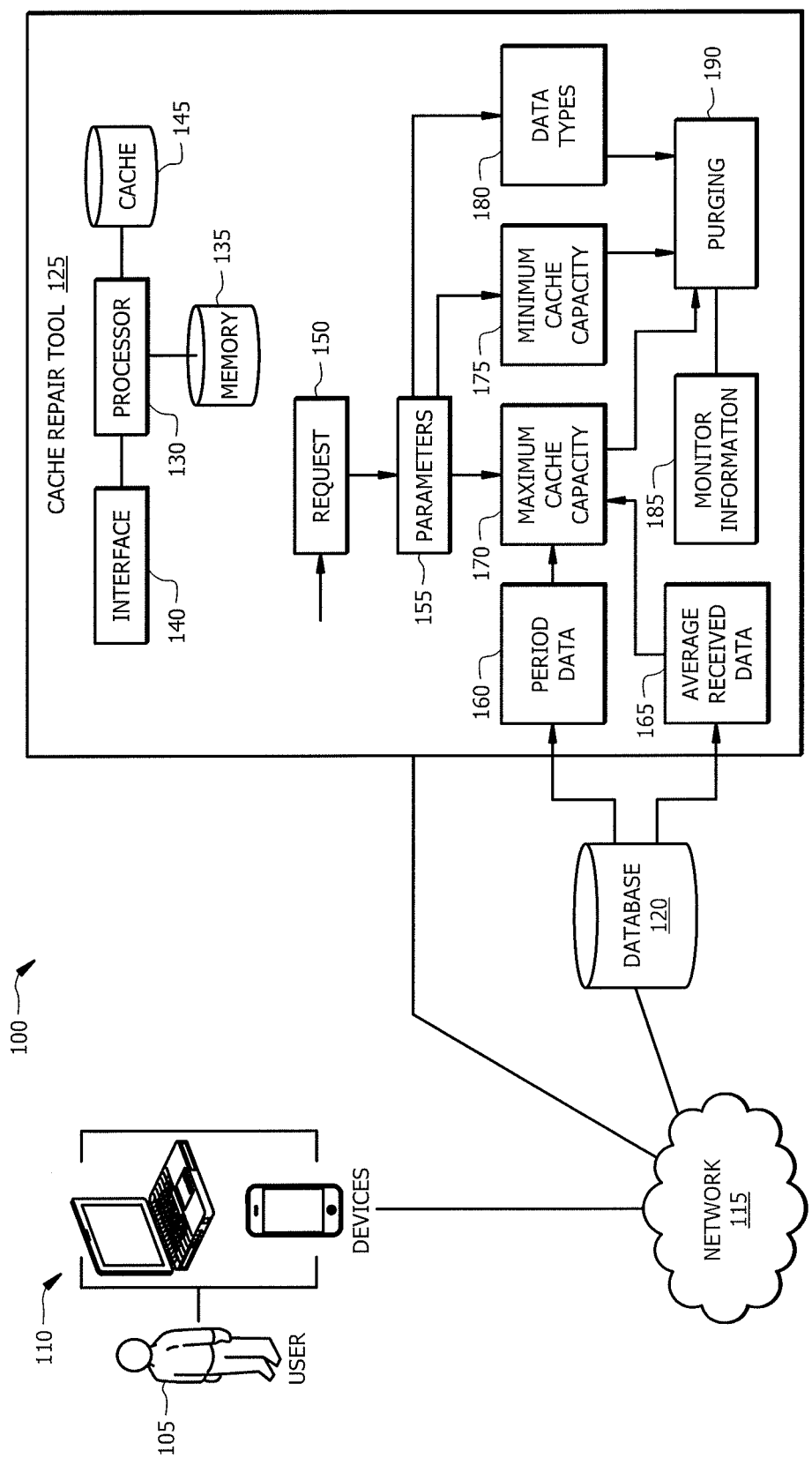
FIG. 1 illustrates a system for repairing a cache.

Embodiments of the present disclosure and its advantages are best understood by referring to FIGS. 1 through 4 of the drawings, like numerals being used for like and corresponding parts of the various drawings.

Computer applications may use caches to store information. Generally, a cache is a relatively small amount of memory that retrieves and communicates information relatively quickly. In some embodiments, a cache may store information that may be used frequently by an application. A processor executing the application may receive information from the cache more quickly than information stored in other types of memory. Thus, storing information in a cache generally allows a processor to execute an application at a faster rate.

Caches generally have a limited capacity. Over time, as data is stored on a cache, the cache may become full. As the cache utilization reaches a certain level, an application executing on a processor may cease working or may begin behaving in an unintended manner. The cache may also cease to quickly communicate information to the processor to execute the application. In certain instances, the cache may stop communicating information altogether once it reaches a certain utilization level. Thus, removing data from a cache to ensure that the cache does not reach a certain utilization level improves the functionality of computing devices by allowing an application to execute properly on a processor.

In traditional systems, data is purged from a cache retroactively on a first in-first out basis. For example, when an application ceases to work or begins misbehaving, a purging process may occur to remove data from the cache, and the data is deleted in the order that it was stored in the cache. Retroactively removing data from the cache causes application downtime. For example, an application may be terminated to remove data from the cache and then restarted. Furthermore, removing data from a cache on a first in-first out basis presents the technical problem of deleting data from the cache that an executing application may need.

This disclosure contemplates an unconventional approach of preemptively, selectively, and intelligently purging data from a cache. In the unconventional approach, a user may determine parameters to purge a cache. A cache repair tool may monitor the cache and preemptively purge data from the cache in real-time as an application is running. This reduces or eliminates application downtime. Furthermore, the cache repair tool may selectively delete data from the cache. Rather than deleting data on a first in-first out basis, a user may specify which types of data to remove from the cache. In some embodiments, a user may rank the importance of types of data and the cache repair tool may remove data based on the ranking. Furthermore, the cache repair tool may intelligently purge data from a cache. For example, the cache repair tool may monitor a cache to determine when, and how much data a cache receives. The cache repair tool may use this information to determine when to begin and/or end purging data from the cache. Furthermore, the cache repair tool may determine which data types are most often used by an application and rank the data types by importance. In these embodiments, the cache repair tool may automatically delete less important and/or less used information from a cache. The unconventional approach contemplated in this disclosure reduces or eliminates application downtime. Furthermore, the approach improves the functionality of computing devices by preemptively ensuring that caches stay below a predetermined utilization threshold while maintaining information that is most relevant to an application. In this manner, the contemplated cache repair tool may resolve several problems inherent to computer technology and networking, such as for example: cache overflow, cache slowdown, and application downtime. As a result, the cache repair tool may improve the underlying computer technology of systems, particularly the operation of the caches of these systems.

The cache repair tool will be described in more detail using FIGS. 1 through 4. FIG. 1 will describe the tool and FIGS. 2 through 4 will describe the tools in more detail.

FIG. 1 illustrates a system 100 for cache repair. As illustrated in FIG. 1, system 100 includes one more devices 110, a network 115, a database 120, and a cache repair tool 125. In particular embodiments, system 100 improves the operation of a computing device by automatically and dynamically repairing a cache.

Devices 110 may be any devices that operate and/or communicate with other components of system 100. Devices 110 may be associated with an enterprise and/or business units of an enterprise. Users 105 may utilize devices 110 to communicate request 150 to cache repair tool 125 and/or execute an application.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 may store periodic data 10, average received data 165, and/or any other suitable type of data. Generally, periodic data 160 indicates whether a cache receives information on a periodic basis. For example, cache 145 may receive information at the beginning of a day, the beginning of a week, the beginning of a month, or any other suitable periodic basis. As discussed in more detail below, cache repair tool 125 may use periodic data 160 to facilitate determining when cache 145 may reach a threshold capacity. Average received data 165 generally indicates an amount of data that cache 145 generally receives. For example, cache 145 may receive a particular amount of data each day, each week, each month, or any other suitable time period. While described as an average amount of data, average received data 165 may be any type of information that indicates an amount of data that cache 145 receives. For example, average received data 165 may indicate a median amount of data, a maximum amount of data, a minimum amount of data, or any other indication of an amount of data. As discussed in more detail below, cache repair tool 125 may use average data 165 to facilitate determining when cache 145 may reach a threshold capacity. Database 120 may communicate information to cache repair tool 125 and/or any other suitable component of system 100. Database 120 may include single database or any suitable number of databases.

Cache tool 125 facilitates repairing cache 145. As illustrated in FIG. 1, cache repair tool 125 includes a processor 130, a memory 135, an interface 140, and a cache 145. This disclosure contemplates processor 130, memory 135, interface 140, and cache 145 being configured to perform any of the operations of cache tool 125 described herein. In particular embodiments, cache repair tool 125 improves the functionality of processor 130 and/or other components of system 100. For example, processor 130 may receive information from cache 145 to process for an application. In some embodiments, cache 145 may communicate information to processor 130 more quickly than memory 135 or other components of system 100. Receiving information more quickly allows processor 130 to retrieve and process information more quickly, thus allowing processor 130 to operate more efficiently. In some embodiments, cache 145 may not provide information to processor 130 quickly or at all. For example, cache 145 may not provide information to processor 130 quickly if cache 145 becomes full. Cache repair tool 125 reduces or eliminates this problem of cache overutilization inherent in cache technology by removing information from cache 145.

Interface 140 represents any suitable device operable to receive information from network 115, transmit information through network 115, perform suitable processing of the information, communicate with components of system 100 and/or other devices, or any combination of the preceding. For example, interface 140 may receive request 150 from device 110. As another example, interface 140 may receive periodic data 160 and/or average received data 165 from database 120. As yet another example, interface 140 communicates information to device 110. Interface 140 represents any port or connection, real or virtual, including any suitable hardware and/or software, including protocol conversion and data processing capabilities, to communicate through a LAN, WAN, or other communication systems that allows cache repair tool 125 to communicate with the components of system 100 directly and/or via network 115. Interface 140 is not limited to a single interface and may encompass multiple interfaces.

Processor 130 is any electronic circuitry, including, but not limited to microprocessors, application specific integrated circuits (ASIC), application specific instruction set processor (ASIP), and/or state machines, that communicatively couples to memory 135 and cache 145 and controls the operation of cache repair tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory 135 and/or cache 145 to perform any of the functions described herein. Processor 130 controls the operation and administration of cache repair tool 125 by processing information received from network 115, device(s) 110, cache 145, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. This disclosure contemplates memory 135 storing any of the elements stored in database 120 and/or by cache repair tool 125.

Cache 145 may store, either permanently or temporarily, data, operational software, or other information for processor 130. Cache 145 may include any one or a combination of volatile or non-volatile local or remote devices suitable for storing information. For example, cache 145 may include random access memory (RAM), read only memory (ROM), magnetic storage devices, optical storage devices, or any other suitable information storage device or a combination of these devices. This disclosure contemplates cache 145 storing any of the elements stored in database 120 and/or by cache repair tool 125. Cache 145 generally stores information for use of an application executing on processor 130. Although illustrated as separate from memory 135, cache 145 may be included in memory 135, in some embodiments. System 100 may include a single cache 145 or any number of caches 145.

In an example embodiment of operation, cache repair tool 125 receives a request 150. Request 150 is generally a request to perform cache repair. For example, request 150 may include a request to monitor and/or purge content from cache 145. Request 150 may be sent by one or more devices 110.

Request 150 may include parameters 155. In some embodiments, cache repair tool 125 may analyze request 150 to determine parameters 155. Parameters 155 generally indicate when and how cache repair tool 125 performs cache repair for cache 145. Parameters 155 may include maximum cache capacity 170. Maximum cache capacity 170 is generally a maximum size threshold less than a total storage capacity of cache 145. For example, if cache 145 includes 100 megabytes of storage, maximum cache capacity 170 may be 75 megabytes or any other suitable amount of storage less than or equal to 100 megabytes. Maximum cache capacity 170 may be expressed as a percentage of the total amount of storage of cache 145, in some embodiments. For example, maximum cache capacity 170 may be 60% of the amount of total storage of cache 145. As another example, the maximum size threshold is 85-95% of the total storage capacity of the cache. In some embodiments, cache repair tool 125 may begin purging data from cache 145 when cache 145 reaches maximum cache capacity 170.

Parameters 155 may include minimum cache capacity 175. Minimum cache capacity 175 is generally a minimum size threshold greater than zero and less than maximum cache capacity 170. For example, if cache 145 includes 100 megabytes of storage, minimum cache capacity 170 may be 50 megabytes or any other suitable amount of storage less than maximum cache capacity 170. Minimum cache capacity 175 may be expressed as a percentage of the total amount of storage of cache 145, in some embodiments. For example, minimum cache capacity 170 may be 40% of the amount of total storage of cache 145. As another example, the minimum size threshold is 50-75% of the total storage capacity of the cache. In some embodiments, cache repair tool 125 may end purging data from cache 145 when cache 145 reaches minimum cache capacity 175.

In some embodiments, cache repair tool 125 may, in addition or alternatively to using parameters 155, determine maximum cache capacity 170 and/or minimum cache capacity 175 using periodic data 160 and/or average received data 165. Cache repair tool 125 may receive periodic data 160 from database 120 and/or memory 135. In some embodiments, cache 145 receives information on a periodic basis. For example, cache 145 may receive data at a certain time of day, a certain day of the week, a certain day of the month, or any other periodic time. Periodic data 160 may indicate, generally, at what time cache 145 receives periodic data 160. Cache repair tool 125 may use periodic data 160 to determine maximum cache capacity 170 and/or minimum cache capacity 175, in some embodiments. For example, cache repair tool 125 may determine, using periodic data 160, that cache 145 may be likely to receive data within a predetermined amount of time. Cache repair tool 125 may determine a relatively low maximum cache capacity 170 to prepare for the receipt of data. For example, cache repair tool 125 may begin purging cache 145 to prepare for the receipt of data. In some embodiments, maximum cache capacity and/or minimum cache capacity 175 may be time varying based on periodic data 160. In some embodiments, maximum cache capacity 170 and/or minimum cache capacity 175 may be static and specified as parameters 155 in request 150.

Cache repair tool 125 may utilize average received data 165 to determine maximum cache capacity 170 and/or minimum cache capacity 175, in some embodiments. Cache repair tool 125 may receive average received data 165 from database 120 and/or memory 135. In some embodiments, cache 145 may receive a particular amount of data each day, each week, each month, or any other suitable time period. While described as an average amount of data, average received data 165 may be any type of information that indicates an amount of data that cache 145 receives. For example, average received data 165 may indicate a median amount of data, a maximum amount of data, a minimum amount of data, or any other indication. In some embodiments, cache repair tool 125 may utilize average received data 165 to estimate an amount of data that cache 145 will receive in a predetermined amount of time. Cache repair tool 125 may utilize average received data 165 to determine maximum cache capacity 170 and/or minimum cache capacity 175. For example, if average received data 165 is higher, cache repair tool 125 may determine a lower maximum cache capacity 170 and/or minimum cache capacity 175. That is, cache repair tool 125 may begin purging cache 145 earlier if cache 145 receives larger amounts of data. Beginning purging may earlier may reduce or eliminate the disadvantages of cache 145 becoming over utilized. In some embodiments, maximum cache capacity and/or minimum cache capacity 175 may be time varying based on average received data 165. In some embodiments, maximum cache capacity 170 and/or minimum cache capacity 175 may be static and specified as parameters 155 in request 150.

Parameters 155 may include data types 180, in some embodiments. Generally, data types 180 facilitate selectively purging cache 145. In some embodiments, data types 180 indicate which data to purge from cache 145. For example, user 105 may indicate in request 150 to purge data in cache 145 by data type. For example, user 105 may determine that certain data in cache 145 is less useful than other data. User 105 may indicate less useful data in data types 180. In some embodiments, user 105 may rank usefulness of data. Cache repair tool 125 may begin purging with the least useful data and continue purging increasing useful data until cache 145 reaches minimum cache capacity 175, in some embodiments. User 105 may indicate data types 180 using metadata, in some embodiments.

In some embodiments, cache repair tool 125 may intelligently determine data types 180. For example, cache repair tool 125 may determine data types 180 based on an application usage. In some embodiments, cache repair tool 125 may determine that an application routinely fetches certain types of data from cache 145. In some embodiments, cache repair tool 125 may determine that an application rarely fetches certain types of data from cache repair tool 125. Cache repair tool 125 may begin purging data that is least used, in some embodiments. In some embodiments, cache repair tool 125 may determine that user 105 is working with a current type of data. For example, user 105 may be utilizing a network security application that has information for a plurality of device types at a plurality of device locations. Cache repair tool 125 may determine that application 105 is using information for a particular device type (e.g., desktop computers). Cache repair tool 125 may intelligently determine data types 180 as device types other than the particular device type. Thus, cache repair tool 125 may begin purging data other than the particular device type form cache 145, in some embodiments. As another example, user 105 may be using an application to monitor a plurality of device types at a particular location. In this example, cache repair tool 125 may intelligently include in data types 180 data that is not associated with the location. In some embodiments, cache repair tool 125 may begin purging data of a data type identified by data types 180 and purge the identified data on a first in-first out basis.

Cache repair tool 125 generates monitoring information 185, in some embodiments. Generally, cache repair tool 125 monitors cache 145 to determine information associated with cache repair tool 125. For example, cache repair tool 125 may monitor cache 145 to determine periodic data 160 and/or average received data 165, in some embodiments. Cache repair tool 125 may monitor cache 145 to determine an amount of data in cache 145. For example, monitor information may indicate whether cache 145 includes an amount of data greater than or equal to maximum cache capacity 170, in some embodiments. Additionally or alternatively, monitor information 185 may indicate whether cache 145 has an amount of data less than or equal to minimum cache capacity 170, in some embodiments. In some embodiments, monitor information 185 may include a capacity of cache 145. Monitor information 185 may include any suitable information related to cache 145.

Cache repair tool 125 may perform purging 190, in some embodiments. Purging 190 generally includes removing data from cache 145. Removing data from cache 145 allows cache 145 to maintain less than a threshold amount of data. Thus cache 145 may operate relatively quickly. In some embodiments, cache repair tool 125 begins purging 190 when cache 145 reaches maximum cache capacity 170. In some embodiments, cache repair tool 125 may purge data from cache 145 until cache 145 reaches minimum cache capacity 125. Cache repair tool 125 may selectively purge data from cache 145 based on data types 180. For example, cache repair tool 125 may identify each data having data type 180 and being purging the identified data. In some embodiments, cache repair tool 125 may purge the identified data on a first in-first out basis. In some embodiment, cache repair tool 125 performs purging 190 while an application is executing (e.g., on processor 130). Purging cache 145 while an application is executing may provide the technical advantage of reducing or eliminating application downtown.

In certain embodiments, the unconventional approach of cache repair tool 125 may also improve the functionality of computing devices by preemptively ensuring that caches stay below a predetermined utilization threshold while maintaining information that is most relevant to an application. In this manner, the contemplated cache repair tool may resolve several problems inherent to computer technology and networking, such as for example: cache overflow, cache slowdown, and application downtime. As a result, the cache repair tool may improve the underlying computer technology of systems, particularly the operation of the caches of these systems.

Modifications, additions, or omissions may be made to system 100 without departing from the scope of the invention. For example, system 100 may include any number of processors 130, memory 135, caches 145, devices 110, and/or databases 120. As yet another example, components of system 100 may be integrated or separated. For example, cache 145 may be included in memory 135, in some embodiments. As another example, in particular implementations, memory 135 multiple memories 135 to store the data descried herein. Although described as a single application utilizing a single cache 145, this disclosure contemplates any number of applications utilizing an number of caches 145.

Figure 2:
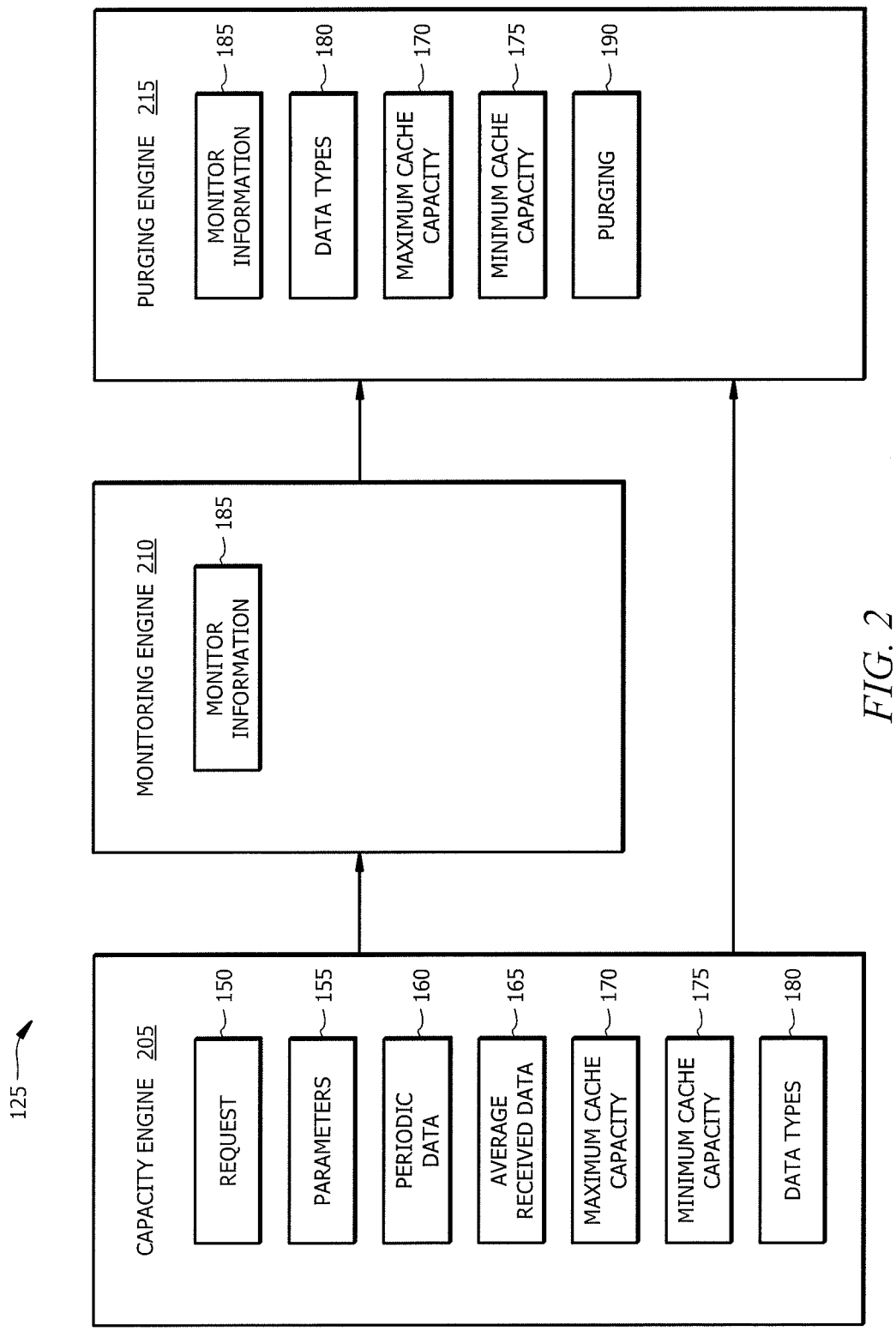
FIG. 2 illustrates the cache repair tool of the system 100 of FIG. 1.

FIG. 2 illustrates cache repair tool 125 of the system 100 of FIG. 1. As illustrated in FIG. 2, cache repair tool 125 includes capacity engine 205, monitoring engine 210, and purging engine 215. In particular embodiments, cache repair tool 125 facilitates purging cache 145. For example, user 105 may communicate a request 150 to perform cache repair for cache 145. A request 150 may include a request to repair cache 145 (e.g., initiate purge 190 when certain conditions are met). Cache repair tool 125 analyzes request 150 to determine parameters 155. In some embodiments, cache repair tool 125 may selectively perform purge 190 using parameters 155. Additionally or alternatively, cache repair tool 125 may use additional data such as periodic data 160 and/or average received data 165 to intelligently perform purging 190.

Capacity engine 205 receives request 150, periodic data 160, and/or average received data 165, in some embodiments. In particular embodiments, capacity engine 205 receives request 150 from one or more devices 110. Capacity engine 205 may receive periodic data 160 and/or average received data 165 from database 120 and/or memory 135. Request 150 may include a request for perform purging 190 on cache 145, in some embodiments. Request 150 may include parameters 155 indicating when and how to perform purging 190. For example, parameters 155 may include maximum cache capacity 170, minimum cache capacity 175, and/or data types 180. In some embodiments, capacity engine 205 may use periodic data 160 and/or average received data 165 in addition to or alternative to parameters 155 to intelligently determine maximum cache capacity 170, minimum cache capacity 175, and/or data types 180. Capacity engine 205 may communicate maximum cache capacity 170, minimum cache capacity 175, and/or data types 180 to purging engine 215. An example algorithm for capacity engine 205 is as follows: wait for request 150; receive request 150 from one or more devices 110; extract parameters 155 from request 150; determine maximum cache capacity 170, minimum cache capacity 175, and/or data types 180 using parameters 155, periodic data 160, and/or average received data 165; and communicate maximum cache capacity 170, minimum cache capacity 175, and/or data types 180 to purging engine 215.

Monitoring engine 210 generally generates monitor information 185. Monitoring engine 210 may receive monitor information 185, in some embodiments. For example, monitoring engine 210 may communicate a request to cache 145 and cache 145 may communicate monitor information 185 to monitor engine 210 in response to the request. In some embodiments, processor 130 may receive information from cache 145. For example, processor 130 may extract some or all of monitor information 185 from cache 145 and store the information using memory 135, in some embodiments. In these embodiments, monitoring engine 210 may receive monitor information 185 from memory 135. This disclosure contemplates monitoring engine 210 receiving monitor information 185 in any suitable manner. Monitoring engine 210 may communicate monitor information 185 to purging engine 215. An example algorithm for monitoring engine 210 is as follows: wait to receive monitor information 185; receive monitor information 185; and communicate monitor information 185 to purging engine 215.

Purging engine 215 generally performs purging 190. Purging engine may receive data types 180, maximum cache capacity 170, and/or minimum cache capacity 175 from capacity engine 205. In some embodiments, purging engine 215 receives monitor information 186 from monitoring engine 210. Purging engine 215 may perform purging 190 based on the received information. For example, purging engine 215 may analyze monitor information to determine whether cache 145 reaches maximum cache capacity 170. Once cache 145 reaches maximum cache capacity 170, purging engine 215 may initiate purging 190. For example, purging engine 215 may delete data from cache 145 based on, at least in part, data types 180. Purging engine 215 may continue to receive and analyze monitor information 185 and cease purging when purging engine 215 determines, using monitor information 185, that cache 145 has reached minimum cache capacity 175. An example algorithm for purging engine 215 is as follows: receive maximum cache capacity 170, minimum cache capacity 175; and/or data types 180; receive monitor information 185; analyze monitor information 185; initiate purging 190 upon a determination that cache 145 reaches maximum cache capacity 170; and end purging 190 upon a determination that cache 145 reaches minimum cache capacity 175.

In certain embodiments, the various engines of cache repair tool 125 may improve the functionality of computing devices by preemptively ensuring that caches stay below a predetermined utilization threshold while maintaining information that is most relevant to an application. In this manner, the contemplated cache repair tool may resolve several problems inherent to computer technology and networking, such as for example: cache overflow, cache slowdown, and application downtime. As a result, the cache repair tool may improve the underlying computer technology of systems, particularly the operation of the caches of these systems.

Modifications, additions, or omissions may be made to cache repair tool 125 depicted in FIG. 2. Request 150 may include maximum cache capacity 170, minimum cache capacity 175, and/or data types 180. In some embodiments, cache repair tool 125 may intelligently determine maximum cache capacity 170, minimum cache capacity 175, and/or data types 180 using periodic data 160, average received data 165, information from cache 145, and/or information from memory 135.

Figure 3:
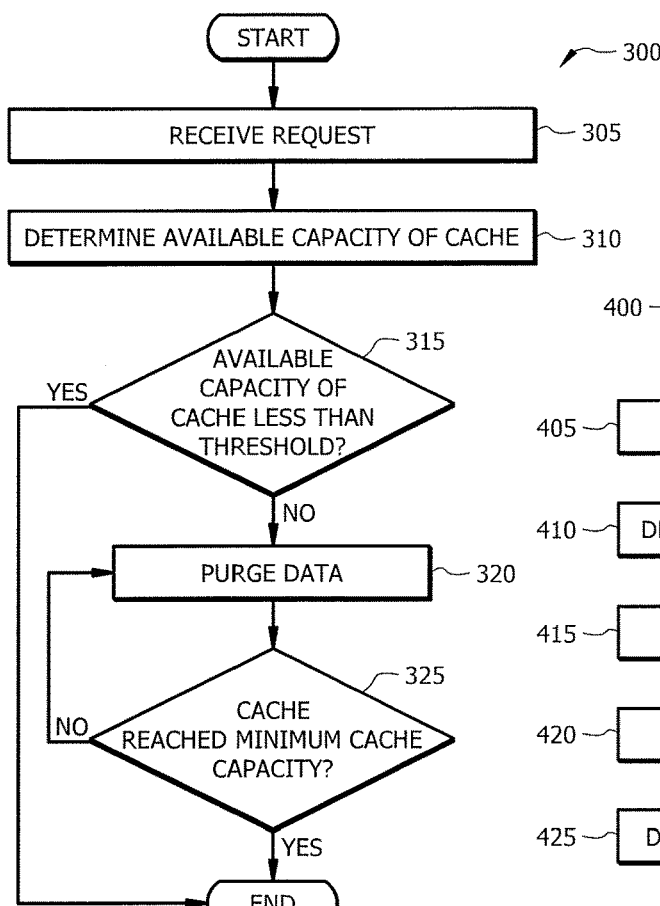
FIG. 3 is a flowchart illustrating a method for real-time cache repair using the system 100 of FIG. 1.

FIG. 3 is a flowchart illustrating a method 300 for performing real-time cache repair using the system 100 of FIG. 1. In particular embodiments, cache repair tool 125 performs method 300. By performing method 300, cache repair tool 125 improves the functionality of cache 145.

Cache repair tool 125 begins by receiving request 150 to perform cache repair at step 305, in some embodiments. Request 150 may include maximum cache capacity 170, minimum cache capacity 175, and/or data types 180. In response to receiving request 150, cache repair tool 125 determines an available capacity of cache 145 at step 310. For example, cache repair tool 125 may use monitor information 185 to determine an available capacity of cache 145.

Cache repair tool 125 determines whether the available capacity determined at step 310 is less than or equal to a predetermined threshold at step 315. For example, cache repair tool 125 may determine whether the available capacity is less than maximum cache capacity 170. If the available capacity is less than or equal to the threshold at step 315, method 300 ends. If the available capacity is not less than the threshold at step 315, method 300 proceeds to step 320 where cache repair tool 125 performs purging 190. As discussed, cache repair tool 125 may use data types 180 to perform purging 190.

Cache repair tool determines an available capacity of cache 145 and whether the available capacity has reached minimum cache capacity 175 at step 325. For example, cache repair tool 125 may continuously monitor the available capacity of cache 145, in some embodiments. If cache 145 has not reached minimum cache capacity 175 at step 325, method 300 proceeds to step 320 where cache repair tool 125 continues to perform purging 190. Otherwise method 300 ends.

Modifications, additions, or omissions may be made to method 300 depicted in FIG. 3. Method 300 may include more, fewer, or other steps. For example, steps may be performed in parallel or in any suitable order. While method 300 discusses cache repair tool 125 performing the steps, any suitable component of system 100 may perform one or more steps of the method. In some embodiments, method 300 may cycle continuously or more than once without ending. In these embodiments, rather than method 300 ending as illustrated in FIG. 3, method 300 may instead proceed to step 310.

Figure 4:
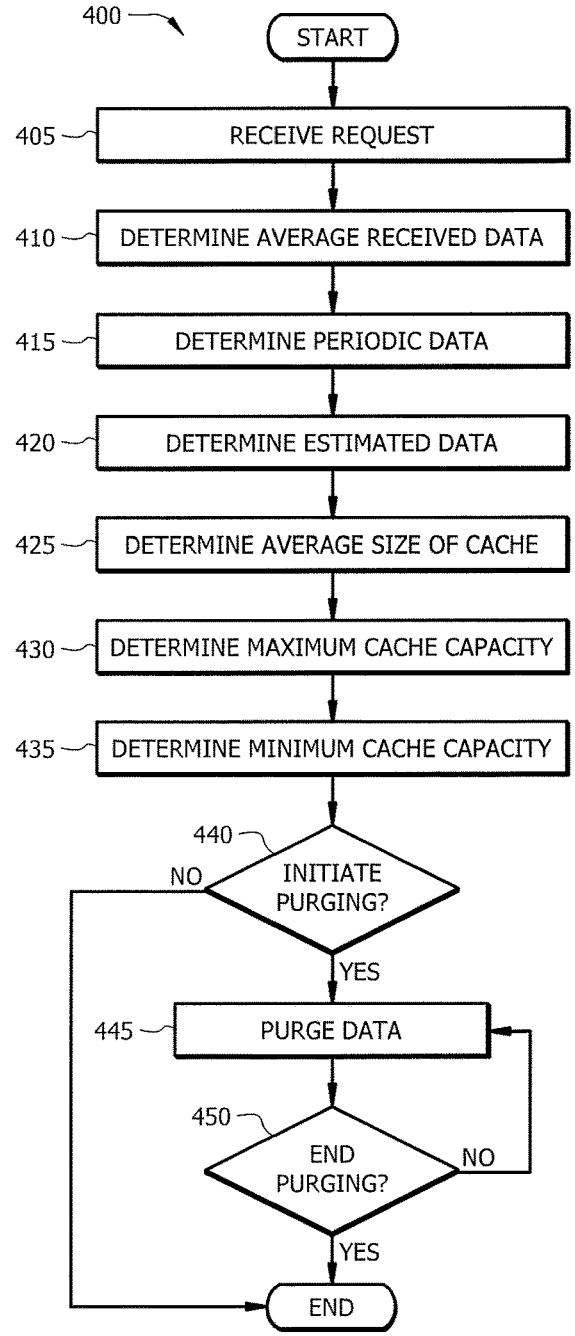
FIG. 4 is a flowchart illustrating a method for self-learning cache-repair using the system 100 of FIG. 1.

FIG. 4 is a flowchart illustrating a method 400 for performing self-learning cache-repair using the system 100 of FIG. 1. In particular embodiments, cache repair tool 125 performs method 400. By performing method 400, cache repair tool 125 improves the functionality of cache 145.

Method 400 begins at step 405 where cache repair tool 125 receives request 150. Request 150 may be a request to perform cache repair. Cache repair tool 125 determines average received data 165 at step 410 and periodic data 160 at step 415. In some embodiments, cache repair tool 125 receives average received data 165 and/or periodic data 160 from database 120 and/or memory 135. Cache repair tool 125 uses average received data 165 and/or periodic data 160 to determine an estimated amount of data at step 420. For example, cache repair tool 125 may estimate an amount of data that cache 145 will receive within a future predetermined amount of time at step 420.

Cache repair tool 125 determines a size availability of cache 145 at step 425. For example, cache repair tool 125 may use monitor information 185 to determine the size availability of cache 145. At step 430, cache repair tool 125 determines maximum cache capacity 170 using the estimated data determined at step 420 and/or the available size determined at step 425. For example, cache repair tool 125 may determine that cache 145 is expected to receive a certain amount of data and cache 145 should have capacity to store the received data. Cache repair tool 125 may determine maximum cache capacity 420 based on these considerations. Similarly cache repair tool 125 determines minimum cache capacity 175 at step 435. Cache repair tool 125 determines whether to initiate purging 190 at step 440. For example, cache repair tool 125 may initiate purging 190 upon a determination that the available size of cache 145 determined at step 425 is greater than maximum cache capacity 170 determined at step 430. If cache repair tool 125 does not initiate purging 190 at step 440, method 400 ends. Otherwise, method 400 begins purging 190 at step 445.

Cache repair tool 125 determines whether to end purging 190 at step 450. For example, cache repair tool 125 may end purging when the available size of cache 145 is less than or equal to minimum cache capacity 175. If cache repair tool 125 determines to end purging 190, method 400 ends. Otherwise method 400 proceeds to step 445 where cache repair tool 125 continues to perform purging 190.

Modifications, additions, or omissions may be made to method 400 depicted in FIG. 4. Method 400 may include more, fewer, or other steps. For example, steps may be performed in parallel or in any suitable order. While method 400 discusses cache repair tool 125 performing the steps, any suitable component of system 100 may perform one or more steps of the method. In some embodiments, method 400 may cycle continuously or more than once without ending. In these embodiments, rather than method 400 ending as illustrated in FIG. 4, method 400 may instead proceed to step 440, in some embodiments.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A cache repair tool, comprising:
an interface configured to receive a request to repair a cache, the request comprising:
a maximum size threshold less than a total storage capacity of the cache;
an identification of a plurality of data types; and
a rank for each data type of the plurality of data types; and
a hardware processor configured to execute software instructions to implement:
a monitoring engine configured to:
estimate an amount of data that the cache will receive in a predetermined amount of time;
determine the maximum size threshold based on the estimated amount of data;
determine an available capacity of the cache; and
determine that the available capacity is less than or equal to the maximum size threshold; and
a purging engine configured to purge from the cache on a first-in-first out basis data of a first data type from the plurality of data types based on the rank of the first data type relative to the ranks of the other data types in the plurality of data types in response to the determination that the determined size exceeds the maximum size threshold.

2. The cache repair tool of claim 1, wherein:
the request further comprises a minimum size threshold; and
the purging engine is further configured to purge data until the cache reaches the minimum size threshold.

3. The cache repair tool of claim 2, wherein the maximum size threshold is 85-95% of the total storage capacity of the cache and the minimum size threshold is 50-75% of the total storage capacity of the cache.

4. The cache repair tool of claim 1, wherein the purging engine purges the data from the cache while an application is running.

5. The cache repair tool of claim 1, wherein an application is network security monitoring application and the data type is one of a device type and a device identification.

6. A method, comprising:
receiving a request to repair a cache, the request comprising:
a maximum size threshold less than a total storage capacity of the cache;
an identification of a plurality of data types; and
a rank for each data type of the plurality of data types; and
estimating an amount of data that the cache will receive in a predetermined amount of time;
determining the maximum size threshold based on the estimated amount of data;
determining an available capacity of the cache; and
determining that the available capacity is less than or equal to the maximum size threshold; and
purging from the cache on a first-in-first out basis data of a first data type from the plurality of data types based on the rank of the first data type relative to the ranks of the other data types in the plurality of data types in response to the determination that the determined size exceeds the maximum size threshold.

7. The method of claim 6, wherein the request further comprises a minimum size threshold and further comprising purging data until the cache reaches the minimum size threshold.

8. The method of claim 7, wherein the maximum size threshold is 85-95% of the total storage capacity of the cache and the minimum size threshold is 50-75% of the total storage capacity of the cache.

9. The method of claim 6, further comprising purging the data from the cache while an application is running.

10. The method of claim 6, wherein an application is network security monitoring application and the data type is one of a device type and a device identification.

11. A non-transitory computer-readable medium comprising software, the software when executed by one or more processing units operable to:
   receive a request to repair a cache, the request comprising:
      a maximum size threshold less than a total storage capacity of the cache;
      an identification of a plurality of data types; and
      a rank for each data type of the plurality of data types; and
   estimate an amount of data that the cache will receive in a predetermined amount of time;
   determine the maximum size threshold based on the estimated amount of data;
   determine an available capacity of the cache; and
   determine that the available capacity is less than or equal to the maximum size threshold; and
   purge from the cache on a first-in-first out basis data of a first data type from the plurality of data types based on the rank of the first data type relative to the ranks of the other data types in the plurality of data types in response to the determination that the determined size exceeds the maximum size threshold.

12. The medium of claim 11, wherein the request further comprises a minimum size threshold and the software when executed by one or more processing units further operable to purge data until the cache reaches the minimum size threshold.

13. The medium of claim 12, wherein the maximum size threshold is 85-95% of the total storage capacity of the cache and the minimum size threshold is 50-75% of the total storage capacity of the cache.

14. The medium of claim 11, the software when executed by one or more processing units further operable to purge the data from the cache while an application is running.

15. The medium of claim 11, wherein an application is network security monitoring application and the data type is one of a device type and a device identification.

* * * * *